UNITED STATES PATENT OFFICE 2,532,547

2-AMINOALKYL-GLYOXALINE DERIVATIVES AND PROCESS FOR THE PRODUCTION THEREOF

Alan August Goldberg, Shepton Mallet, and Leo Philipp Ellinger, Halewood, Liverpool, England, assignors to Ward, Blenkinsop & Company Limited, London, England, a British company No Drawing. Application October 31, 1947, Serial No. 783,438. In Great Britain September 12, 1946

Section 1, Public Law 690, August 8, 1946
Patent expires September 12, 1966

9 Claims. (Cl. 260—309.6)

This invention relates to aminoalkyl glyoxaline derivatives of the general formula

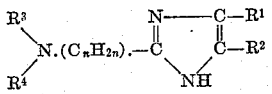

in which $n$ is an integer, $R^1$ and $R^2$ are hydrogen or alkyl, aryl or aralkyl groups and $R^3$ and $R^4$ are both hydrogen or alkyl, aryl and aralkyl groups or are hydrogen and the acyl residue of an organic carboxylic or sulphonic acid respectively or together form the acyl residue of an organic dicarboxylic acid and to a method for the production thereof.

The present invention provides 2-aminoalkyl glyoxalines having the general formula

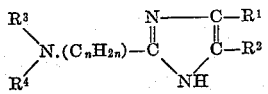

in which $n$ is an integer, $R^1$ is selected from hydrogen, alkyl, aryl and aralkyl, $R^2$ is selected from hydrogen, alkyl, aryl and aralkyl, $R^3$ is selected from hydrogen, alkyl, aryl, aralkyl and acyl and $R^4$ is selected from hydrogen, alkyl, aryl, aralkyl and acyl.

The invention also provides a process for the production of a substituted aminoalkyl glyoxaline derivative which comprises reacting a substituted aminoalkyl iminoether of the general formula

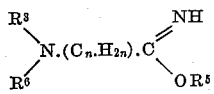

in which $n$ is as above defined, $R^3$ is hydrogen or an alkyl, aryl or aralkyl group and $R^6$ is the acyl residue of an organic carboxylic or sulphonic acid, or $R^3$ and $R^6$ are both alkyl, aryl or aralkyl groups or $R^3$ and $R^6$ together consist in the acyl residue of an organic dicarboxylic acid and $R^5$ is an alkyl or aralkyl group, with a substance which, in one tautomeric form, has the general formula

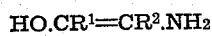
HO.CR$^1$=CR$^2$.NH$_2$ in which $R^1$ and $R^2$ are as above defined.

The product of the reaction between the substituted aminoalkyl iminoether and the substance which, in one tautomeric form, has the general formula

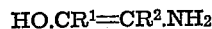
HO.CR$^1$=CR$^2$.NH$_2$ is a 2-(substituted aminoalkyl) glyoxaline which may carry substituents in the 4- and 5-positions of the glyoxaline ring, the substituent of the amino group being that of the iminoether from which it is derived.

The substituted aminoalkyl iminoethers containing an acylamidoalkyl group which form one of the starting materials in the process of the present invention may be obtained by treating an N-disubstituted alkyl cyanide of the general formula

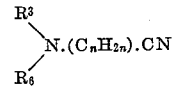

in which $n$ and $R^3$ are as defined above and $R^6$ is an acyl residue as defined above with a hydrogen halide in the presence of an alkanol, such as ethanol, as described, for example, in British Patent Specification No. 605,952. The group $R^6$ may be an alkyl, aryl, aralkyl or heterocyclic carboxylic acid or sulphonic acid residue. It may, for example, be an acetyl, propionyl, n-butyryl, iso-butyryl, benzoyl, substituted benzoyl such as para-acylamidobenzoyl, toluoyl, phenylacetyl, picolinyl, nicotinyl or isonicotinyl residue or an ethane, n-butane, benzene, naphthalene, toluene or phenylethane sulphonyl residue. Thus the acylamidoalkyl iminoether employed may have as the acyl group a benzene sulphonyl group which contains as a substituent in the para position to the sulphonyl group an amino group, a protected amino group, a substituted amino group, or a group which is readily convertible to an amino group. Benzene sulphonamidoalkyl imino ethers other than those containing an amino group, a protected amino group or a group readily convertible to an amino group may also be employed, for example, those containing alkyl, hydroxyl and alkoxyl substituents which may be present in the para or any other position. There may also be employed those benzene sulphonamidoalkyl imino ethers which contain two or more substituents in the benzene ring. The groups $R^3$ and $R^6$ together may represent the residue of a dibasic organic carboxylic acid such as succinic or phthalic acid.

There may also be employed the N-disubstituted aminoalkyl iminoethers in which the substituents carried by the disubstituted nitrogen atom of the amino group are alkyl, aryl or aralkyl groups and these may be like or unlike in character. These iminoethers may be obtained by treating the corresponding N-disubstituted aminoalkyl cyanides, for example, diethylaminoacetonitrile and β-diethylaminopropionitrile with a hydrogen halide in the presence of an alkanol such as ethanol or an aralkanol such as benzyl alcohol.

The substance which, in one tautomeric form, has the general formula $$OH \cdot CR^1 = CR^2 \cdot NH_2$$

is an α-aminocarbonyl compound or a derivative thereof. Examples of such substances are aminoacetone, aminoacetaldehyde, ω-aminoacetophenone and α-aminopropiophenone. According to a modification of the process of the invention, instead of using a substance having the said general formula, there may be used a substance which is readily convertible into such substance, such as the acetals of the said aminoaldehydes and ketones and the O-alkyl ethers of the enol forms of the α-aminocarbonyl compound.

The reaction between the substituted aminoalkyl iminoether and the substance having, in one tautomeric form, the aforesaid general formula may be brought about in solution or in partial solution in a lower alkanol. Since the free α-aminocarbonyl compounds are not stable compounds it is preferred to release them from their salts in two or more stages by successive additions of base to the reaction mixture containing the salt of the imino ether and that of the α-aminocarbonyl compound or to add the freshly liberated base in successive portions to the other constituents of the reaction mixture. About 30% of the α-aminocarbonyl compound may thus be first released or added to the reaction mixture while the remaining 70% is released or added in one or two subsequent portions. Preferably a solution of the iminoether in the alkanol is first obtained by dissolving the iminoether hydrochloride in the alkanol and adding a substantially equivalent quantity of an alkali metal alkoxide such as sodium ethoxide. The reaction proceeds smoothly at room temperature or below and the release or addition of successive portions of α-aminocarbonyl compound can conveniently take place on successive days.

When the reaction is complete or substantially so, the alkali metal halide formed is removed, the alkanol is distilled off and the residue lixiviated with cold dilute acid, the insoluble non-basic material filtered off and the substituted aminoalkylglyoxaline precipitated by the addition of cold, concentrated aqueous alkali.

When a substance which is readily convertible into an α-aminocarbonyl compound or a derivative thereof is employed any reagent or reagents necessary to bring about the said conversion under the reaction conditions should also be present in the reaction mixture.

When a carboxylic acylamidoalkyl iminoether is employed in the reaction the product is the corresponding 2-(carboxylic acylamidoalkyl) glyoxaline and, the carboxylic acid residue may be readily split off and the free 2-(aminoalkyl)-glyoxaline obtained. Such hydrolysis may, for example, be effected with aqueous mineral acid, the organic acid liberated by the hydrolysis removed, the remaining aqueous solution basified and the free amine separated in any convenient manner. The hydrolysis may also be effected with aqueous alkali. When the acyl group is a phthaloyl group, deacylation with hydrazine by the method of Ing and Manske J. Chem. Soc. 1926, 2348 may be utilized.

The free amine thus obtained can either with or without separation and purification, be converted into any desired derivation, for example, it can be converted into a salt thereof such as the hydrochloride or sulphate.

When a sulphon acylamidoalkyl iminoether is employed in the reaction the product is the corresponding 2-(sulphon acylamidoalkyl)-glyoxaline. When a p-acylaminobenzene sulphonamidoalkyliminoether is employed in the reaction the product is the corresponding 2-(p-acylaminobenzene sulphonamidoalkyl) glyoxaline.

According to a feature of the invention the acylamido group of a 2-(p-acylamidobenzenesulphonamidoalkyl)-glyoxaline may be hydrolysed to remove the acyl radical and form the corresponding compound containing a free amino group in the para-position of the benzene ring. This may be carried out using any of the known reagents and conditions for hydrolysing a carboxylic acyl group in the presence of a sulphonamido group.

The 2-(aminoalkyl)-glyoxalines are bases of the histamine series and possess valuable pharmacological properties.

The following examples illustrate the manner in which the invention may be carried into effect.

EXAMPLE 1

2-(benzamidomethyl)-4-methyl glyoxaline and 2-aminomethyl-4-methyl glyoxaline 128 g. of benzamidoacetimino ether hydrochloride is added over 10 minutes to a stirred solution of 15.2 g. of sodium in 400 c. c. of dry ethyl alcohol at —5° C. After stirring for a further 10 minutes at this temperature a solution of 52 g. of aminoacetone hydrochloride in 200 c. c. of ethyl alcohol is added over ½ hour, the mixture stirred at —5° to 0° C. for 1 hour and then allowed to stand at room temperature for 24 hours. The mixture is then again cooled to —5° C., stirred, and a solution of 7.7 g. of sodium (0.7 mol.) in ethyl alcohol added dropwise over 1 hour. After standing at room temperature for 3 days the sodium chloride is filtered off and the filtrate evaporated to dryness at room temperature. The gummy residue is dissolved in 100 c. c of boiling acetone, the filtered solution allowed to cool and the precipitated crystals of 2-(benzamidomethyl)-4-methyl glyoxaline collected and washed with 60 c. c. of cold acetone. After drying in a vacuum these amount to 32.5 g. and have M. P. 184–186° C. The acetone mother liquors are evaporated to dryness at reduced pressure and the residual gum dissolved in 120 c. c. of cold 2 N hydrochloric acid. The filtered solution is allowed to stand at 5° C. for 3 hours and the crystalline precipitate of by-product filtered off. Basification of the filtrate with saturated sodium carbonate solution precipitates an oil which hardens on standing at 0° C. for 48 hours. The precipitate is collected and dissolved in 50 c. c. of boiling acetone; on cooling and standing a further quantity of the desired glyoxaline separates in small prisms (13 g.; M. P. 184–186° C.). The total yield of 2-(benzamidomethyl)-4-methyl glyoxaline is 45.5 g. (Found in sample recrystallised from acetone M. P. 184–186° C.: C, 66.8; H, 6.2; N, 19.9. $C_{12}H_{13}ON_3$ required C, 67.0; H, 6.1; N, 19.6%.)

32.5 g. of the foregoing benzamido compound is refluxed with 320 c. c. of 5 N hydrochloric acid for 4 hours, the solution cooled and the precipitated benzoic acid removed. The filtered solution is evaporated to dryness at reduced pressure at less than 40° C., the residue dissolved in the minimal amount of hot water and then 200 c. c. of dry alcoholic 4% hydrogen chloride added. On standing in the ice chest 2-aminomethyl-4-methyl glyoxaline dihydrochloride separates in flat prisms (21 g.; M. P. 248–250° C.). The mother liquors yield a further 3 g. on concentration at reduced pressure. (Found in recrystallised material dried over phosphorus pentoxide: N, 24.3; Cl, 38.2. $C_{12}H_{15}ON_3Cl_2$ requires: N, 22.8; Cl, 39.1%.)

The di(p-nitrobenzoate) of the 2-aminomethyl-4-methyl glyoxaline crystallizes from alcohol in colourless plates M. P. 190–192° C. (Found: C, 51.0; H, 4.2; N, 16.0%. $C_{19}H_{19}O_8N_5$ requires C, 51.2; H, 4.2; N, 15.8%.)

EXAMPLE 2

78 g. of β-phthalimido propionimino ether hydrochloride is added portionwise to a stirred solution of 8.7 g. of sodium (1.3 mol.) in 160 c. c. of dry ethanol at —5° C. After the addition the mixture is stirred for a further 10 minutes and a solution of 30.5 g. of aminoacetone hydrochloride in 200 c. c. of ethanol is added dropwise over 1½ hours at —5° C. The mixture is stirred at this temperature for a further 1½ hours and a second quantity of sodium (4.0 g.; 0.7 mol.) dissolved in 80 c. c. of ethanol added over 1½ hours. After standing for 1–2 days at room temperature the sodium chloride is removed and the alcoholic solution concentrated to dryness at reduced pressure at less than 40° C. The residual gum is lixiviated with cold 2 N hydrochloric acid, the insoluble material separated and the filtered solution basified. The precipitated oil which solidifies on standing is purified by dissolution in cold dilute hydrochloric acid and reprecipitated with aqueous alcoholic acetone, 2-(β-phthalimidoethyl)-4-methyl glyoxaline being obtained in colourless prisms M. P. 186° C. (Found: N, 16.4;

$C_{14}H_{13}O_2N_2$ requires: N, 16.5%.)

The β-phthalimido propion-imino ether hydrochloride used as starting material is obtained by the action of hydrogen chloride and ethyl alcohol on β-phthalimido propionitrile.

EXAMPLE 3

A solution of 20 gms. of β-benzamidopropionitrile in 180 c. c. of dry chloroform and 30 c. c. of dry alcohol is saturated with anhydrous hydrogen chloride at 0°–5° C. and then kept in the ice chest for 24 hours. The solvent is pumped off at 20°–30° C. and the residual β-benzamidopropioniminoethyl ether hydrochloride suspended in 50 c. c. of benzene and added rapidly to a solution of 3.6 gms. of sodium in 80 c. c. of ethyl alcohol stirred at —5° C. After 10 minutes, a solution of 10.8 gms. of aminoacetone hydrochloride in 150 c. c. of alcohol is added dropwise with stirring at —5° C. over a period of 1½ hours. The mixture is allowed to stand at 0° C. for 24 hours, a solution of 1.0 gm. of sodium in 30 c. c. of alcohol added dropwise with stirring at —5° C. over a period of 1 hour and the mixture allowed to stand for 48 hours at 0° C. and then for 24 hours at room temperature. The insoluble matter is filtered off, the filtrate evaporated to dryness at reduced pressure and the residue dissolved in 50 c. c. of 2 N hydrochloric acid. The resulting solution is allowed to stand at 0° C. overnight, the small precipitate filtered off and the filtrate basified with concentrated aqueous sodium carbonate. The oil which precipitates solidifies on standing in the ice chest for 12 hours. This solid is redissolved in 2 N hydrochloric acid, the solution filtered and rebasified with aqueous sodium carbonate. The solid thus obtained is ground with cold acetone and the residual insoluble 2-(β-benzamido ethyl)-4-methyliminazole (7.2 g.; M. P. 202–204° C.) collected. On recrystallisation twice from boiling acetone it is obtained in small colourless needles M. P. 205–207° C. (Found: C, 68.2; H, 6.5; N, 18.4. $C_{13}H_{15}ON_3$ requires: C, 68.2; H, 6.5; N, 18.4%.)

The foregoing benzamido compound (5 g.) is refluxed with 5 N hydrochloric acid (50 c. c.) for 4 hours and the resulting solution allowed to stand on ice overnight. The precipitate of benzoic acid is removed and the solution evaporated at reduced pressure to dryness. The residue is dissolved in the minimum amount of boiling water and 2% alcoholic hydrogen chloride; on standing, 2-(β-aminoethyl)-4-methyl iminazole dihydrochloride separates in colourless plates (3.7 g.) M. P. 260–262° C. (Found: N, 22.2; Cl 35.5. $C_6H_{13}N_3Cl_2$ requires: N, 21.2; Cl, 35.8%.)

The di(p-nitrobenzoate) of the 2-(β-aminoethyl)-4-methyl iminazole crystallises from alcohol in light yellow prisms M. P. 180–182° C. (Found: C, 52.5; H, 4.5; N, 15.1%. $C_{20}H_{21}O_8N_5$ requires C, 52.3; H, 4.5; N, 15.3%.)

If in Example 1 there is substituted for the aminoacetone hydrochloride, a corresponding molecular quantity of ω-aminoacetophenone hydrochloride there is obtained 2-benzamidomethyl)-4 phenyl glyoxaline and this on hydrolysis with 5 N hydrochloric acid and removal of precipitated benzoic acid yields 2-aminomethyl-4-phenyl glyoxaline.

We claim:

1. As new products 2-aminoalkyl glyoxalines having the general formula

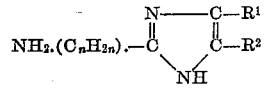

in which $n$ is a positive integer and $R^1$ and $R^2$ are both selected from the group consisting of hydrogen, alkyl, aryl and aralkyl, and salts thereof.

2. As new products 2-aminomethyl 4-methyl-glyoxaline and its salts.

3. As new products 2-β-aminoethyl 4-methyl-glyoxaline and its salts.

4. As new products 2-aminomethyl-4-phenyl-glyoxaline and its salts.

5. A process for the production of a 2-aminoalkyl glyoxaline having the general formula

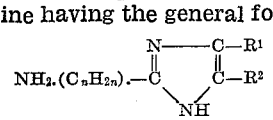

in which $n$ is a positive integer, $R^1$ and $R^2$ are both selected from the group consisting of hydrogen, alkyl, aryl and aralkyl which comprises reacting an aminoalkyl imino ether having the general formula

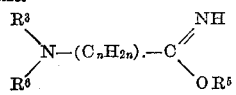

in which $n$ is a positive integer, $R^3$ is selected from the group consisting of hydrogen, alkyl, aryl, aralkyl and acyl, $R^5$ is selected from the group consisting of alkyl and aralkyl groups and $R^6$ is an acyl group, with an α-aminocarbonyl compound, which in one tautomeric form, has the general formula

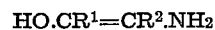

$HO.CR^1=CR^2.NH_2$ in which $R^1$ and $R^2$ are as above defined to produce a 2-acylamidoalkyl glyoxaline and there-after hydrolysing said acylamido group to an amino group.

6. A process according to claim 5 in which the α-amino carbonyl compound is added portionwise to the reaction mixture.

7. A process according to claim 5 in which the α-amino carbonyl compound is monoaminoacetone.

8. A process according to claim 5 in which the α-amino carbonyl compound is aminoacetaldehyde.

9. A process according to claim 5 in which the α-amino carbonyl compound is omega-aminoacetophenone.

ALAN AUGUST GOLDBERG.
LEO PHILIPP ELLINGER.

REFERENCES CITED

The following references are of record in the file of this patent:

FOREIGN PATENTS

| Number | Country | Date |
| --- | --- | --- |
| 392,067 | Germany | Dec. 7, 1920 |

OTHER REFERENCES

Chemical Abstracts, vol. 18, p. 3059, citing Berichte 57B pp. 953–959 (1924).

Chem. Abstracts, vol. 35, p. 5897 (1941), citing: Cook and Jones, Journ. Chem. Soc. (London), 1941: 278–282.